(12) United States Patent
Nakazato et al.

(10) Patent No.: US 6,667,000 B1
(45) Date of Patent: Dec. 23, 2003

(54) METHOD OF PRODUCING AN ELECTRODE

(75) Inventors: Daisuke Nakazato, Ichikawa (JP); Yousuke Miyaki, Nagano (JP); Hitoshi Maro, Saku (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/646,108

(22) PCT Filed: Mar. 24, 1999

(86) PCT No.: PCT/JP99/01513

§ 371 (c)(1),
(2), (4) Date: Sep. 25, 2000

(87) PCT Pub. No.: WO99/50919

PCT Pub. Date: Oct. 7, 1999

(30) Foreign Application Priority Data

Mar. 26, 1998 (JP) .......................................... 10-100002

(51) Int. Cl.$^7$ .............................................. C04B 35/00
(52) U.S. Cl. ....................................................... 264/104
(58) Field of Search ................................ 264/104, 105, 264/123, 127, 128, 255; 427/58, 77

(56) References Cited

U.S. PATENT DOCUMENTS

| | | | | |
|---|---|---|---|---|
| 4,133,856 A | * | 1/1979 | Ikeda et al. .................. | 264/104 |
| 4,216,045 A | * | 8/1980 | Morioka ...................... | 156/242 |
| 4,297,231 A | * | 10/1981 | Kahara et al. ............... | 264/104 |
| 5,882,820 A | * | 3/1999 | Matsui et al. ............... | 429/219 |

FOREIGN PATENT DOCUMENTS

| | | |
|---|---|---|
| EP | 0 814 521 A2 | 12/1997 |
| JP | 50-133432 | 10/1975 |
| JP | 57103263 A | 6/1982 |
| JP | 07006752 A | 1/1995 |
| JP | 08329946 A | 12/1996 |
| JP | 9-129237 A1 | 5/1997 |
| JP | 9-237623 A1 | 9/1997 |
| JP | 10139444 A | 5/1998 |
| JP | 10255763 A | 9/1998 |

* cited by examiner

Primary Examiner—Angela Ortiz
(74) Attorney, Agent, or Firm—Rader, Fishman & Grauer PLLC

(57) ABSTRACT

A method for industrial and simplified production of an electrode for a non-aqueous electrolyte battery without unfavorable peeling of the electrode coating layer while maintaining the flexibility of the electrode is provided.

An electrode for a non-aqueous electrolyte battery is produced by mixing an electrode active material with a polymer material substantially having no melting point at not higher than 300° C. to prepare an electrode coating-material, applying the electrode coating-material onto an electrode collector, drying the electrode having the coating layer formed, and then carrying out a heating treatment at a temperature not higher than 300° C. for less than 30 hours before or after compression-molding. The heating temperature is preferably 100 to 300° C., and the heating time is preferably 30 minutes to 24 hours.

6 Claims, No Drawings

US 6,667,000 B1

METHOD OF PRODUCING AN ELECTRODE

TECHNICAL FIELD

The present invention relates to a method of producing an electrode for a non-aqueous electrolyte battery, and more particularly to a method of producing, with a high productivity, an electrode for a non-aqueous electrolyte battery, which electrode is excellent in mechanical strength.

BACKGROUND ART

In accordance with scale reduction and weight reduction of various electronic devices such as OA machines, VTR cameras, portable phones and the like in recent years, there is a demand for higher performance of a secondary battery used in these electronic devices. In order to meet these demands, lithium ion secondary batteries are rapidly being developed for practical use as non-aqueous electrolyte batteries having a high discharge potential and a high discharge capacity.

Each of the positive electrode and the negative electrode of a non-aqueous electrolyte battery is produced by mixing an active material with a binder to form an electrode coating-material (mixture), and applying it onto a collector, followed by drying. The battery is produced by superposing and winding up a positive electrode, a separator and a negative electrode, which are obtained in sheets, and encapsulating them together with an electrolytic solution in a battery container.

However, since a stress is imposed on the electrode at the time of winding up or encapsulating the positive electrode, the separator and the negative electrode, unfavorable peeling of the electrode coating layer is generated if the mechanical strength of the electrode is insufficient. This leads to decrease in the yield, and is a factor for higher costs.

In order to solve this problem, the peeling strength of the electrode coating layer has been conventionally increased by increasing the binder composition in the coating layer. However, increase in the binder composition naturally leads to decrease in the composition of the electrode active material in the electrode coating layer, thereby decreasing the battery capacity per unit weight.

Also, for example, in Japanese Laid-open Patent Publication No. 9-237,623/1997, the adhesiveness of the coating layer is enhanced by allowing the amount of the residual N-methylpyrrolidone (NMP) to be 50 to 500 ppm relative to the electrode weight. According to the examples in said Patent Publication, the amount of the residual NMP is adjusted by increasing the period of time for drying immediately after the application of the electrode coating-material. However, when industrial production is considered, the application and drying must inevitably be carried out in successive steps, so that in order to increase the period of time for drying, the amount of application production per hour must be dropped, or otherwise the drying furnace must be made long and large so as to meet the amount of application production. In either case, the productivity falls.

Further, in Japanese Laid-open Patent Publication No. 7-6,752/1995, the electrodes are heated at a temperature not less than the melting point of the binder after the step of pressing the electrodes so as to prevent non-uniform distribution of the binder for improvement of the peeling strength of the coating layer. However, flexibility of the electrodes is deteriorated if a crystalline polymer material having a melting point is used as the binder. As a result, defective cracks may possibly occur in the electrode coating layer in the case of encapsulating the electrode into a battery container by bending it with a small curvature radius in a square-type battery or the like.

DISCLOSURE OF THE INVENTION

Objects of the Invention

Therefore, the object of the present invention is to solve the above-mentioned problem of the prior art, and to provide a method for industrial and simplified production of an electrode for a non-aqueous electrolyte battery without unfavorable peeling of the electrode coating layer while maintaining the flexibility of the electrode by a method other than a drying treatment immediately after application of the electrode coating-material.

SUMMARY OF THE INVENTION

The present inventors have made eager studies and, as a result, found out that an electrode without unfavorable peeling of the coating layer is obtained while maintaining flexibility by using a polymer material substantially having no melting point at not higher than 300° C. as the binder, and carrying out a heating treatment under a specific condition after the electrode coating-material is applied and dried with the use of a polymer material substantially having no melting point at no higher than 300° C. as the binder, thereby completing the present invention. It is understood that the expressions "having no melting point at not higher than 300° C." and "having no melting point at no higher than 300° C." have the same meaning as "having a melting point at or below 300° C."

That is, the present invention is a method of producing an electrode for a non-aqueous electrolyte battery by mixing an electrode active material with a binder to prepare an electrode coating-material, applying the electrode coating-material onto an electrode collector, drying the electrode having the coating layer formed, and then compression-molding the dried electrode, wherein the method comprises using a polymer material substantially having no melting point at not higher than 300° C. as the binder, and carrying out a heating treatment at a temperature not higher than 300° C. for less than 30 hours after the electrode coating-material is applied and dried.

In the present invention, it is preferable that the heating treatment is carried out after the electrode is dried, and thereafter the electrode is compression-molded. Further, the electrode is preferably subjected to the heating treatment in a roll state.

The production method of the electrode of the present invention can be applied to any of a positive electrode and a negative electrode.

DETAILED DESCRIPTION OF THE INVENTION

First, in the method of the present invention, a slurry-like electrode coating-material is prepared by mixing an electrode active material and a binder together with a solvent. Further, in this step, an electrically conductive agent or an additive may possibly be added in accordance with the needs.

As the electrode active material, various materials can be used without particular limitation as long as they are conventionally used as an electrode active material.

As a positive electrode active material, for example, inorganic compounds such as transition metal oxides and transition metal chalcogen compounds containing an alkali metal, conductive polymers such as polyacetylene, poly-p-phenylene, polyphenylenevinylene, polyaniline, polypyrrole, polyazulene, polyphthalocyanine, polythiophene, cross-linked polymers having a disulfide linkage, thionyl chloride and the like may be mentioned. Among these, oxides or chalcogen compounds of transition metals such as cobalt, manganese, molybdenum, vanadium, chromium, iron, copper, titanium and the like are suitable in the case of a secondary battery using a non-aqueous electrolyte solution containing a lithium salt, and $Li_xCoO_2$ ($0<x\leq1.0$), $Li_xNiO_2$ ($0<x\leq1.0$), $Li_xCo_yNi_{1-y}O_2$ ($0<x\leq1.0$, $0<y\leq1.0$), $Li_{1+x}Mn_{2-x}O_4$ ($0\leq x\leq\frac{1}{3}$), $Li(M, Mn)_2O_4$ (M=Cr, Co, Al, B) are especially preferable in view of high potential, stability and long life.

Further, as a negative electrode active material, for example, carbonaceous materials, tin oxides and others are used. The carbonaceous materials are not particularly limited, and for example, amorphous carbon, coal cokes, petroleum cokes, vapor growth carbon fibers, hard carbon (slightly graphitizable carbon), polymer carbon, natural graphite, artificial graphite, and others may be mentioned. Among these, those skilled in the art can make a suitable choice in accordance with the intended properties of the battery. When the material is used in a negative electrode of a secondary battery using a non-aqueous electrolyte solution containing an alkali metal salt, PAN-type carbon fibers, pitch-type carbon fibers and vapor growth carbon fibers are preferable, and particularly PAN-type carbon fibers and pitch-type carbon fibers are preferable because of good doping of lithium ions.

As the binder in the present invention, it is necessary to use a polymer material substantially having no melting point at not higher than 300° C. Such a polymer material for use can be various non-crystalline polymer binders that are conventionally used. For example, fluororubbers and the like can be used.

The binder is used usually at an amount of 1 to 40 parts by weight, preferably 1 to 25 parts by weight, especially preferably 1 to 15 parts by weight, with respect to 100 parts by weight of the electrode active material.

The solvent is not particularly limited, and various solvents conventionally used in preparing an electrode coating-material can be used. For example, N-methylpyrrolidone (NMP), methyl isobutyl ketone (MIBK), methyl ethyl ketone (MEK), cyclohexanone, toluene and others may be mentioned.

The electrically conductive agent can be added for the purpose of complementing the electrically conductive property of the electrode active material in accordance with the needs. The electrically conductive agent is not particularly limited, and various known electrically conductive agents may be suitably used. For example, acetylene black, graphite, fine particles of gold, silver, copper and the like may be mentioned.

In addition, various known additives such as lithium carbonate, oxalic acid, maleic acid and the like can be added.

The electrode active material, the binder, the electrically conductive agent, the solvent and others can be mixed by an ordinary method. For example, they are mixed under a dry air or inert gas atmosphere by a roll mill method.

Next, the obtained slurry-like electrode coating-material is applied onto an electrode collector. The application may be carried out either on both surfaces of the collector or only on one surface in accordance with the object of the electrode. In the case of applying the electrode coating-material on both surfaces of the collector, the subsequent drying step may be carried out after the electrode material is applied simultaneously on both surfaces or alternatively a drying step may be carried out after the electrode coating-material is applied on one surface and subsequently a drying step may be carried out after the coating-material is applied on the other surface.

In the present invention, a metal foil, a metal sheet, a metal net or the like is used as the electrode collector. The metal material for the electrode collector is not particularly limited, and various metal materials that are conventionally used in electrode collectors can be used. As such metal materials, for example, copper, aluminum, stainless steel, nickel, iron, gold, platinum, titanium and the like may be mentioned; and copper, aluminum and the like are preferable. The thickness of the electrode collector to be used is usually 1 to 30 μm, preferably 5 to 20 μm.

The electrode coating-material can be applied on the electrode collector by an ordinary method. For example, the application is carried out with the use of an extrusion coat, a bar coater, a doctor knife, a wire bar or the like.

Subsequently, the electrode having the coating layer formed is dried to remove the solvent. This drying step can be carried out by an ordinary method. For example, it is dried at 110° C. for about 6 minutes. If the period of time for drying is too long, it is not preferable because then the productivity of the electrode decreases.

In the production method of the present invention, a heating treatment is carried out at a temperature not higher than 300° C. for less than 30 hours after the electrode is dried. By carrying out the heating treatment, a practically sufficient peeling strength is obtained.

The atmosphere for the heating treatment is not particularly limited, but it can be carried out in atmospheric air, in dried air, in an atmosphere of nitrogen gas or rare gas, or in vacuum. The heating treatment is preferably carried out in dried air or in nitrogen gas.

The temperature for the heating treatment is usually within a range of 70 to 300° C., preferably within a range of 100 to 300° C., more preferably within the range of 130 to 300° C. The period of time for the heating treatment is preferably 30 minutes to 24 hours. The higher the temperature for the heating treatment is, the more likely the effect is obtained even with a short period of time for the heating treatment. Those skilled in the art can suitably select the temperature for the heating treatment and the period of time for the heating treatment.

In the present invention, the electrode is cut to predetermined dimensions respectively in the width direction and in the longitudinal direction and compression-molded with the use of a roller press in accordance with the needs, during the period of time after application and drying of the electrode coating-material up till incorporation of the electrode into the battery container. The cutting generally includes a slitting step of forming the electrode to have a predetermined width in the direction of production flow and a cutting step of forming it to have a desired length. By performing the compression-molding, the density of the electrode coating-material is increased, and the electrode is adjusted to have a constant thickness.

In the present invention, the slitting step, the cutting step, the compression-molding step and the heating treatment step may be carried out in any order. Carrying out the heating treatment step before the compression-molding step is generally preferable because then the residual strain immediately after drying can be eliminated more easily than carrying out the heating treatment step after the compression-molding step.

Further, if the electrode is subjected to the heating treatment before the cutting step, the electrode can be heated as it is wound up in a roll state, thereby providing an advantage that the heating treatment can be carried out in a small heating furnace. Further, if the electrode roll is heated after it is made small by the slitting step, the electrode roll can be handled with easily. Furthermore, in the case of carrying out the heating treatment in a roll state, the effect of the present invention is not affected whether it is an outer circumferential portion or an inner circumferential portion of the roll.

After the electrode is inserted into the battery container, the electrolytic solution is injected into the container, followed by sealing to produce a battery.

The electrolytic solution of a non-aqueous electrolyte battery using the electrode produced by the present invention may be a conventionally known electrolytic solution. As an electrolytic solution of a secondary battery which solution is composed of a non-aqueous electrolytic solution containing an alkali metal salt, propylene carbonate, ethylene carbonate, γ-butyrolactone, N-methylpyrrolidone, acetonitrile, N,N-dimethylformamide, dimethyl sulfoxide, tetrahydrofuran, 1,3-dioxolane, methyl formate, sulfolane, oxazolidone, thionyl chloride, 1,2-dimethoxyethane, diethylene carbonate, derivatives and mixtures thereof and the like may be mentioned. As the electrolyte contained in the electrolytic solution, halides, perchlorates, thiocyanates, boron fluorides, phosphorus fluorides, arsenic fluorides, aluminum fluorides, trifluoromethyl sulfates and the like of an alkali metal, particularly lithium, may be mentioned.

According to the method of producing an electrode for a non-aqueous electrolyte battery of the present invention, an electrode without unfavorable peeling of the coating layer is obtained because using a polymer material substantially having no melting point at not higher than 300° C. as a binder, and the heating treatment is carried out at a temperature not higher than 300° C. for less than 30 hours after an electrode coating-material is applied and dried on an electrode collector. The reason why the peeling strength is improved by a heating treatment under such a condition is not yet made clear; however, the present inventors consider it as follows.

The thickness of the electrode coating-material immediately after application on the collector and the thickness of the electrode coating layer after evaporation of the solvent by drying are greatly different with a ratio of about 1:½. Therefore, residual strain may possibly remain in the coating layer during the drying after application. This residual strain may possibly form a site where mechanical strength is locally inferior in the electrode coating layer, and peeling may start at this site where the strength is locally inferior. Therefore, if a heating treatment is carried out after the electrode is dried, the residual strain may possibly be eliminated, and as a result, the site where the mechanical strength is locally inferior may disappear to improve the peeling strength.

Further, according to the production method of the present invention, the flexibility of the electrode is also maintained because a polymer material substantially having no melting point at not higher than 300° C. is used as the binder.

MODES FOR CARRYING OUT THE INVENTION

Hereafter, the present invention will be further described in detail byway of examples; however, the present invention is not limited by these alone.

EXAMPLE 1

First, a slurry-like coating-material for a positive electrode having a composition shown in Table 1 was prepared.

TABLE 1

| Composition of coating-material for positive electrode | |
|---|---|
| $LiCoO_2$ (electrode active material) | 92 parts by weight |
| Acetylene black (electrically conductive agent) | 5 parts by weight |
| Fluororubber (binder) | 3 parts by weight |
| Methyl isobutyl ketone (MIBK) (solvent) | 45 parts by weight |
| N-methylpyrrolidone (NMP) (solvent) | 45 parts by weight |

Regarding the preparation of the coating-material for a positive electrode, 93 parts by weight of lacquer were prepared by dissolving 3 parts by weight of the binder into 90 parts by weight of a mixture solvent obtained by mixing two kinds of the solvents both in 45 parts by weight. Apart from this, 92 parts by weight of the active material and 5 parts by weight of the electrically conductive agent were mixed in dryness to prepare 97 parts by weight of a mixture powder. Next, 97 parts by weight of the mixture powder were added into 93 parts by weight of the lacquer, followed by kneading to produce a positive electrode coating-material.

Then, after the aforementioned positive electrode coating-material was applied onto one surface of an electrode collector made of aluminum foil having a thickness of 20 μm by extrusion coat, it was dried for 6 minutes in a drying furnace of 110° C. Thereafter, a similar application and drying operation was carried out on the other surface of the aluminum foil. The amount of application was the same on both surfaces, and was 27 mg in terms of the active material mass per 1 $cm^2$ of one surface.

Next, the electrode having the electrode active material layer formed on both surfaces thereof was slit in a longitudinal direction to a predetermined width-dimension, and wound up in a roll form.

Thereafter, the electrode in the roll state was heated at 70° C. for 30 minutes in a nitrogen atmosphere.

The obtained electrode was compression-molded by applying a roller press to produce an electrode for a battery which electrode had a total thickness of 190 μm.

The obtained electrode was subjected to measurement of peeling strength and judgement of flexibility as follows.

Measurement of Peeling Strength

It was carried out in accordance with the T-shape peeling of JIS K 6854 (peeling bond strength test method). In other words, the electrode obtained as described above was cut out to a size of 1 cm×15 cm. Meanwhile, an adhesive tape having a width of 1 cm was prepared in a length of 15 cm. The top of the electrode piece was aligned with the top of the adhesive tape and the both were firmly bonded each other for a length of 10 cm. A paper piece for protection was stuck onto the remaining part of the adhesive tape so that the adhesive part would not be exposed.

The part of the electrode piece on which the adhesive tape is not stuck and the paper piece were respectively fixed to sample fixing parts of the tensile tester and pulled at a speed of 2.5 cm per second to determine its average tensile force as the peeling strength. During the measurement, the part of the electrode piece which was bonded to the adhesive tape was constantly kept at an angle of 90° with respect to the pulling direction.

Here, the peeling strength was determined as a relative numerical value assuming that the peeling strength of the later-mentioned Comparative Example 1 without the heating treatment was 100.

Judgement of flexibility

The flexibility was judged by whether cracks were generated or not in the coating layer when the electrode cut to a 1 cm width was bent to 180°.

EXAMPLE 2

The same operation as in Example 1 was carried out except that the heating temperature was 130° C.

EXAMPLE 3

The same operation as in Example 1 was carried out except that the heating temperature was 150° C. and the heating time was 5 hours.

EXAMPLE 4

The same operation as in Example 1 was carried out except that the heating temperature was 150° C. and the heating time was 24 hours.

EXAMPLE 5

The same operation as in Example 1 was carried out except that the heating treatment was not carried out before the compression-molding, and that the heating treatment was carried out at a temperature of 70° C. for a period of time of 30 minutes after the compression-molding.

EXAMPLE 6

The same operation as in Example 5 was carried out except that the heating temperature was 130° C.

EXAMPLE 7

The same operation as in Example 5 was carried out except that the heating temperature was 150° C. and the heating time was 5 hours.

EXAMPLE 8

The same operation as in Example 5 was carried out except that the heating temperature was 150° C. and the heating time was 24 hours.

EXAMPLE 9

The same operation as in Example 5 was carried out except that the heating temperature was 300° C. and the heating time was 5 hours.

EXAMPLE 10

The same operation as in Example 1 was carried out except that the heating temperature was 60° C. and the heating time was 5 hours.

EXAMPLE 11

The same operation as in Example 1 was carried out except that the heating temperature was 80° C. and the heating time was 25 minutes.

Comparative Example 1

The same operation as in Example 1 was carried out except that the heating treatment was not carried out.

Comparative Example 2

The same operation as in Example 1 was carried out except that the heating temperature was 350° C.

Comparative Example 3

The same operation as in Example 1 was carried out except that the heating temperature was 300° C. and the heating time was 30 hours.

Comparative Example 4

The same operation as in Example 1 was carried out except that 3 parts by weight of polyvinylidene fluoride (PVDF) having a melting pint around 180° C. were used in place of fluororubber as the binder, and 90 parts by weight of NMP were used instead of using MIBK as the solvent in Table 1, and that the heating temperature was 80° C.

The results of the above Examples 1 to 11 and Comparative Examples 1 to 4 are shown in Table 2.

TABLE 2

| | Heating treatment | Heating temperature | Heating time | Peeling strength | Generation of cracks |
|---|---|---|---|---|---|
| Example 1 | Before compression-molding | 70° C. | 30 minutes | 105 | not generated |
| Example 2 | Before compression-molding | 130° C. | 30 minutes | 135 | not generated |
| Example 3 | Before compression-molding | 150° C. | 5 hours | 210 | not generated |
| Example 4 | Before compression-molding | 150° C. | 24 hours | 208 | not generated |
| Example 5 | After compression-molding | 70° C. | 30 minutes | 110 | not generated |
| Example 6 | After compression-molding | 130° C. | 30 minutes | 130 | not generated |
| Example 7 | After compression-molding | 150° C. | 5 hours | 174 | not generated |
| Example 8 | After compression-molding | 150° C. | 24 hours | 175 | not generated |
| Example 9 | After compression-molding | 300° C. | 5 hours | 180 | not generated |
| Example 10 | Before compression-molding | 60° C. | 5 hours | 101 | not generated |
| Example 11 | Before compression-molding | 80° C. | 25 minutes | 101 | not generated |

TABLE 2-continued

|  | Heating treatment | Heating temperature | Heating time | Peeling strength | Generation of cracks |
|---|---|---|---|---|---|
| Comparative Example 1 | not carried out |  |  | 100 | not generated |
| Comparative Example 2 | Before compression-molding | 350° C. | 30 minutes | Wrinkles appeared on the coating layer | not generated |
| Comparative Example 3 | Before compression-molding | 300° C. | 30 hours | Wrinkles appeared on the coating layer | not generated |
| Comparative Example 4 | Before compression-molding | 80° C. | 30 minutes | 110 | generated |

From Table 2, it is understood that the electrodes of Examples to 11 of the present invention in which the heating treatment has been carried out show improvements in peeling strength as compared with the electrodes of Comparative Example 1 in which the heating treatment has not been carried out. Further, by comparison of Examples 1 to 4 and Examples 5 to 8, a tendency is seen such that the effect of improvement in peeling strength is greater in the case where the heating treatment is carried out before the compression-molding step than in the case where the heating treatment is carried out after the compression-molding step. However, the effect of improvement in peeling strength is small in Example 10 because the heating temperature is low and in Example 11 because the heating time is short. Furthermore, in all of the electrodes of Examples 1 to 11, generation of cracks is absent in the bending test, and the flexibility is good as well.

On the other hand, in the cases of Comparative Example 2 in which the heating treatment was carried out at 350° C. and Comparative Example 3 in which the heating treatment was carried out at 350° C. for 30 hours, wrinkles were disadvantageously generated in the coating layer during the heating, thereby producing poor products.

Further, regarding the electrode of Comparative Example 4 in which PVDF, which is a crystalline polymer, was used as the binder, cracks were generated in the electrode by the bending test, thereby raising a problem in flexibility.

The present invention can be carried out in various other modes without departing from its spirit or principal characteristics. Therefore, the foregoing Examples are in all respects merely illustrative and must not be construed as being restrictive. Further, changes pertaining to equivalents of the scope of the claims are all comprised within the scope of the present invention.

INDUSTRIAL APPLICABILITY

As described above in detail, according to the present invention, the strength of the electrode coating layer is improved while maintaining the flexibility because the residual strain in the coating layer is eliminated by using a polymer material substantially having no melting point at no higher than 300° C. as a binder, and carrying out a heating treatment at a temperature not higher than 300° C. for less than 30 hours after an electrode coating-material is applied and dried on an electrode collector.

Thus, the method of the present invention is a method capable of industrial and simplified production of an electrode for a non-aqueous electrolyte battery without unfavorable peeling of the electrode coating layer and with excellent flexibility.

What is claimed is:

1. A method of producing an electrode for a non-aqueous electrolyte battery by mixing an electrode active material with a binder to prepare an electrode coating material, forming the electrode by applying the electrode coating material onto an electrode collector, drying the electrode, and then compression-molding the dried electrode, wherein the method comprises using a polymer material substantially having a melting point at or below 300° C. as the binder, and carrying out a heat treatment at a temperature at or below 300° C. for less than 30 hours after the electrode coating material is applied and dried, wherein the electrode is heated in a roll state.

2. The method of producing an electrode according to claim 1, wherein the heating treatment is carried out at a temperature from 100 to 300° C.

3. The method of producing an electrode according to claim 1, wherein the heating treatment is carried out for 30 minutes to 24 hours.

4. A method for producing an electrode for use with a non-aqueous electrolyte by mixing an electrode active material with a binder to prepare an electrode coating material, forming the electrode by applying the electrode coating material onto an electrode collector, drying the electrode, and then compression-molding the dried electrode;

wherein the method comprises using a polymer material substantially having no melting point at not higher than 300° C. as the binder, and carrying out a heating treatment at a temperature not higher than 300° C. for less than 30 hours after the electrode coating material is applied and dried, and wherein the electrode is heated in a roll state.

5. The method for producing an electrode according to claim 4, wherein the heating treatment is carried out at a temperature from 100 to 300° C.

6. The method for producing an electrode according to claim 4, wherein the heating treatment is carried out for 30 minutes to 24 hours.

* * * * *